March 10, 1936.                J. A. ROSE                2,033,206
                              TRANSFORMER
                          Filed Feb. 20, 1934
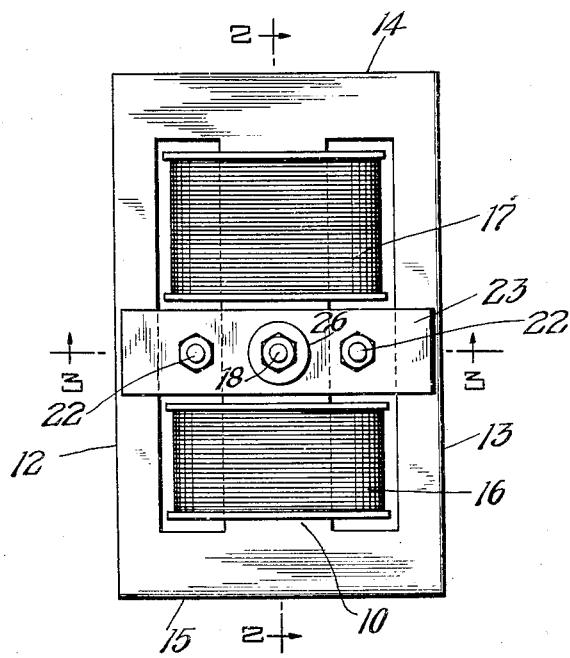
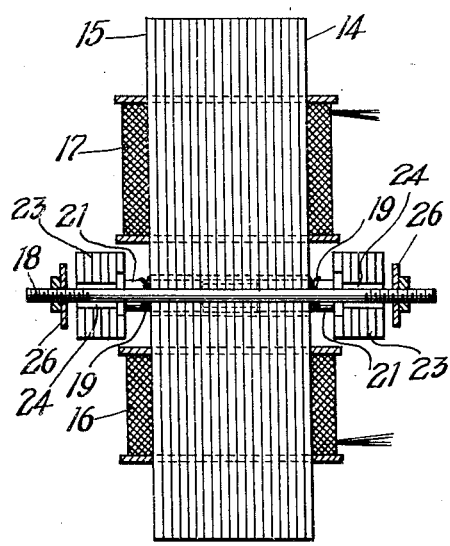
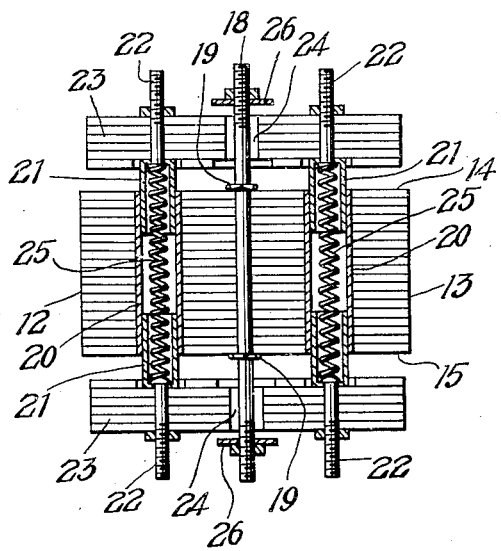
INVENTOR
James A. Rose
BY
Kenyon & Kenyon
ATTORNEYS Patented Mar. 10, 1936

2,033,206

UNITED STATES PATENT OFFICE 2,033,206

TRANSFORMER

James A. Rose, Lancaster, Pa.

Application February 20, 1934, Serial No. 712,121

6 Claims. (Cl. 171—119)

This invention relates to transformers.

In transformers, there is a magnetic flux leakage path around the primary coil and it is an object of this invention to vary the magnetic conductance of such leakage path to compensate for changes of impedance in the secondary coil circuit to maintain constant current in the secondary circuit with constant current flowing in the primary coil circuit.

In one embodiment of the invention, one or more bars of iron or other conductor of magnetic flux are supported for movement toward and away from the core of the transformer in the magnetic flux leakage path to vary the conductance of said path and thereby control the supply of flux to the secondary coil. Preferably, the leakage bars are moved automatically to compensate for any change of impedance in the secondary coil circuit thus maintaining constant current in the secondary coil circuit with constant current supplied to the primary coil circuit.

The bars are drawn toward the core by magnetic attraction and such movement is opposed by springs. It is believed that the counter flux set up by reason of an increase in the secondary circuit current increases the primary flux reluctance and that, therefore, the primary flux tends to follow a path of less reluctance. The flux is thereby distorted and tends to create flux paths through the air between the iron paths and the distorted flux polarizes the leakage paths so that they are attracted by the transformer core. The springs oppose the movement of the leakage bars and tend to maintain them in such position that the desired condition of constant current in the secondary coil circuit is maintained.

In the case of a short circuit in the secondary coil circuit, the leakage bars are pulled into contact with the core and are firmly held in such position until the short circuit is removed. During the existence of the short circuit the leakage bars divert flux from the secondary coil and at the same time create a closed magnetic path around the primary coil, thus setting up a primary coil magnetic circuit of known impedance that will limit the amount of current flowing in the primary coil. With such leakage bars, a short circuit in the secondary coil circuit can exist for an unlimited time without excessive heating in either the primary or secondary coils.

Other objects, novel features and advantages of this invention will be apparent from the following specification and accompanying drawing, wherein:

Fig. 1 is a front elevation of a shell type transformer embodying the invention;

Fig. 2 is a section on the line 2—2 of Fig. 1, and

Fig. 3 is a section on the line 3—3 of Fig. 1.

The transformer core which may be built up of laminations in the usual manner comprises a central leg 10 and side legs 12 and 13, the three legs being connected by top and bottom pieces 14 and 15 respectively. Primary and secondary coils 16 and 17 are mounted on the leg 10 and are slightly spaced from each other. The arrangement just described is of a well-known type of transformer.

A rod 18 passes through the center leg 10 approximately midway of the space between the adjacent ends of the primary and secondary coils 16 and 17 and cotter pins 19 hold the rod in position. Tubular guides 20 of non-magnetic material extend through the air gaps between the central and side cores in alinement with the rod 18 and are held in place by wedge 21t. Cups 21 of non-magnetic material extend into the guides 20 and are slidably supported therein. These cups are attached in pairs by means of non-magnetic bolts 22 to iron bars 23 having apertures 24 through which extend the ends of the rod 18. Springs 25 have their ends seated in the cups 21 and oppose movement of the bars 23 toward the core 10. Collars 26 carried by the rod 18 limit movement of the bars 23 away from the core.

In the operation of the transformer above described, constant current is supplied to the primary coil and the leakage bars 23 provide means for varying the magnetic leakage path around the primary coil to maintain uniform current in the secondary coil circuit. Assume that with a given impedance in the secondary coil circuit, the bars 23 are drawn by magnetic attraction into the position shown in Fig. 3 against the action of the springs 25. Now, if the impedance be decreased in the secondary coil circuit, the current in said circuit will tend to increase. Such current increase will result in an increase in the magnetic attraction applied to the bars 23 tending to pull them toward the core 10 and the bars will accordingly move in toward the core. The conductance of the magnetic leakage path around the primary core is thereupon increased so that the supply of magnetic flux to the secondary coil is correspondingly decreased with the result that there is a corresponding decrease in the current flowing in the secondary circuit and a reduction in the magnetic attraction applied to the bars 23, permitting the springs to move the bars away from the core. These bars will, therefore, move toward and away from the core until they reach a position at which the current in the secondary coil circuit returns to its original amperage.

In the event of a complete short circuit in the secondary coil circuit, the bars 23 will be drawn into contact with the core 20 and provide a closed metallic magnetic path around the primary coil. The magnetic flux will be diverted from the secondary coil and a primary coil of known impedance that will limit the amount of current flowing to the primary coil is set up, thus protecting both the primary and secondary coils against excessive heating.

Although the invention has been specifically described in an embodiment wherein the leakage bars are automatically moved toward and away from the transformer core, it is to be understood that the invention contemplates another means of operating the leakage bars and that the same may be moved manually or by means of suitable solenoids or the like. Furthermore, it is to be understood that various modifications may be made in the device above described, without in any way departing from the spirit of the invention as defined in the appended claims.

Although the invention has been specifically described in connection with a shell-type transformer, it is apparent that the invention is adapted for use in connection with any other type of transformer, as for example, the core type.

I claim:

1. In combination, a transformer comprising a shell-type core having a central member, spaced primary and secondary coils mounted on said central member, an iron bar supported in alinement with the space between said coils for movement toward and away from said core in response to variation in magnetic pull exerted thereon by current flowing in said coils.

2. In combination, a transformer comprising a shell-type core having a central member, spaced primary and secondary coils mounted on said central member, an iron bar arranged in alinement with the space between said coils, non-magnetic means supporting said bar from said core for movement toward said core in response to magnetic pull exerted thereon by current flowing in said coils, and yielding means opposing movement of the bar toward said core.

3. In combination with a transformer comprising spaced primary and secondary coils mounted on a common core, a bar arranged in alinement with the space between said coils, non-magnetic guides supported by said core, non-magnetic cups attached to said bars and extending into said guides, springs having their ends seated in said cups, and means to limit movement of said bars away from said core.

4. In combination with a transformer comprising spaced primary and secondary coils mounted on a common core, a bar arranged in alinement with the space between said coils, non-magnetic guides supported by said core, non-magnetic cups attached to said bars and extending into said guides, springs having their ends seated in said cups, a rod passing through said core and bars, and stops on said rod for limiting movement of said bars away from said core.

5. In combination, a transformer comprising a shell-type core having a central member, spaced primary and secondary coils mounted on said member, an iron bar arranged in alinement with the space between said coils and non-magnetic means supporting said bar from said core for movement toward and away therefrom in response to variation in the magnetic pull exerted thereon by current flowing in said coils.

6. In combination, a transformer comprising a shell-type core having a central member, spaced primary and secondary coils mounted on said member, a bar supported in alinement with the space between said coils for movement toward said core in response to magnetic pull exerted thereon by current flowing in said coils, and means tending to oppose such movement of the bar.

JAMES A. ROSE.